United States Patent
Hochmuth et al.

[11] Patent Number: 5,896,973
[45] Date of Patent: Apr. 27, 1999

[54] CLAMP-TYPE LOCKING MECHANISM, IN PARTICULAR FOR ADJUSTING A SEAT POSITION

[75] Inventors: Harald Hochmuth, Hagenbüchach; Andreas Willaczek, Hernhofen; Joachim Ritter, Herzogenaurach, all of Germany

[73] Assignee: Ina Wälzlager Schaeffler Ohg, Herzogenaurach, Germany

[21] Appl. No.: 08/836,634
[22] PCT Filed: Sep. 22, 1995
[86] PCT No.: PCT/EP95/03734
§ 371 Date: May 15, 1997
§ 102(e) Date: May 15, 1997
[87] PCT Pub. No.: WO96/20352
PCT Pub. Date: Jul. 4, 1996

[30] Foreign Application Priority Data

Dec. 24, 1994 [DE] Germany .......................... 44 47 480.6

[51] Int. Cl.[6] .................. F16D 41/10; B60N 2/22
[52] U.S. Cl. ...................... 192/223.2; 297/361.1
[58] Field of Search .................. 192/7, 8 R, 44, 192/223.2; 188/134; 297/361.1, 374

[56] References Cited

U.S. PATENT DOCUMENTS

| | | |
|---|---|---|
| 2,681,718 | 6/1954 | Stoner . |
| 3,243,023 | 3/1966 | Boyden ................. 192/8 R |
| 4,457,416 | 7/1984 | Kutzler . |
| 4,982,823 | 1/1991 | Yoshida . |
| 5,248,017 | 9/1993 | Schwarzbich ............ 192/8 R |
| 5,522,488 | 6/1996 | Schwarzbich ............ 192/8 R |
| 5,593,210 | 1/1997 | Schwarzbich ........... 297/361.1 |

FOREIGN PATENT DOCUMENTS

| | | |
|---|---|---|
| 0497007 | 8/1992 | European Pat. Off. . |
| 1934131 | 2/1970 | Germany . |
| 3529274 | 2/1987 | Germany . |
| 4129617 | 9/1992 | Germany . |
| 9315132 | 12/1993 | Germany . |
| 361444 | 5/1962 | Switzerland . |
| 23637 | 5/1911 | United Kingdom . |
| 418544 | 10/1934 | United Kingdom . |

Primary Examiner—Richard M. Lorence
Attorney, Agent, or Firm—Henry M. Feiereisen

[57] ABSTRACT

A clamp-type locking mechanism includes a housing (1) with an inner cylindrical clamping surface (3) and with driving elements (5) and driven elements (4) positioned concentrically therewith. The driven element (4) is provided with clamping ramps (23, 24) facing the clamping surface (3), which have arranged thereon clamping roller pairs formed of two clamping rollers (25) successively placed along the circumference. Both clamping rollers (25) are spring-biased by an interposed spring element (26, 30) in direction away from each other towards the clamping surface (3) and the clamping ramp (23, 24), with the driven element (4) being provided with stops (28) for claws (19) of the driving element (5). The claws (19) have on the sides facing the stops (28) contact areas (27) for one of each of the clamping rollers (25) of a clamping roller pair, wherein a circumferential clearance between the stops (28) and the claws (19) is greater than a circumferential clearance between the contact areas (27) and the clamping rollers (25). It is proposed to construct the driven element (4) in form of a thin-walled sheet metal part (6) with clamping ramps (23, 24) and stops (28) formed thereon in a non-cutting manner. It is furthermore proposed to construct the driving element (5) in form of a plastic disk (8) with integral plastic claws (19), and of a driving member (9) so connected to the plastic disk (8) that a rotation therebetween is prevented.

12 Claims, 4 Drawing Sheets

5,896,973

CLAMP-TYPE LOCKING MECHANISM, IN PARTICULAR FOR ADJUSTING A SEAT POSITION

FIELD OF THE INVENTION

The present invention relates to a clamp-type locking mechanism including a housing with an inner cylindrical clamping surface, with driving elements rotatable with respect to the housing and with driven elements positioned coaxially with respect to the cylindrical clamping surface, with the driven element being provided with clamping ramps facing the clamping surface for arrangement of clamping roller pairs in the form of two clamping rollers arranged successively in circumferential direction, whereby both clamping rollers of the clamping roller pairs are spring-biased by an interposed spring element in direction away from each other towards the clamping surface and the clamping ramp, with the driven element being provided with stops for claws of the driving element that engage between two neighboring clamping roller pairs, and with the claws forming contact surfaces for one of each of the clamping rollers of a clamping roller pair at their sides facing the stops, whereby a peripheral clearance between the stops and the claws is greater than a peripheral clearance between the contact areas and the clamping rollers.

BACKGROUND OF THE INVENTION

A clamp-type locking mechanism of this type is known for example from German Patent No. 4,129,617. In this clamp-type locking mechanism, the housing is advantageously formed by a sheet metal sleeve which is machined without cutting and thus producable on a large scale in an inexpensive manner. However, the driven element and the driving element are formed as massive components, resulting in high weight and increased manufacturing costs. Such clamp-type locking mechanisms are used, for example, in seat adjustments of motor vehicles. In these applications, the driving element is connected for example with a hand wheel, the driven element is connected for example with the seat surface or the back support of the seat, and the housing is connected with a stationary console. Further developments of such clamp-type locking mechanisms strive to produce products of a lower weight and lower manufacturing costs while at least maintaining an equivalent quality.

SUMMARY OF THE INVENTION

In accordance with the invention, it is proposed to provide the driven element in form of a thinwalled sheet metal part, with clamping ramps and stops formed thereon in non-cutting manner. Depending on the application, it is frequently possible to make the walls of the sheet metal very thin so that the driven elements according to the invention are significantly lighter than conventional driven elements.

A further proposal according to the invention involves formation of the driving element by a plastic disk with integral plastic claws and a driving member that is secured to the plastic disk such as to prevent rotation therebetween. This driving element can be advantageously made through injection process to thereby produce a significantly lighter driving element compared to the conventional driving element.

A driven member may be advantageously connected to this sheet metal part such as to prevent rotation therebetween, with the driven member being formed for example by a gear.

It is of advantage to form the sheet metal part by an annular closed sheet metal jacket which is drawn radially inwards at several locations spaced about the circumference at formation of valleys, whereby peripheral walls of the valleys form the stops, and whereby flat plateaus are provided between neighboring valleys for forming the clamping ramps.

In such further developed clamp-type locking mechanisms, it is suitable to provide each of the claws with two contact surfaces for two pairs of clamping rollers arranged at both sides of the claws. In this manner, each claw is able to use one of its both contact surfaces in order to force one clamping roller of one of both clamping roller pairs out of its clamping zone in both rotational directions of the driving element. This bilaterally acting claw allows closely spaced dispositions of clamping roller pairs.

The sheet metal part may be suitably provided on one axial end with a radially inwardly flanged sheet metal collar which exhibits an inner perimeter forming a polyhedron. The polyhedron is provided for reliably transmitting the torque to the driven member.

It is also suitable to provide a sliding bearing between the driven element and the housing. In this manner, the driven member is easily rotatable within the housing and moreover properly centered so as to ensure a secure operation of the clamp-type locking mechanism.

Advantageously, a cylindrical pin which is arranged coaxially to the driving element and the driven element is anchored in the driven element, with the plastic disk being supported upon the pin by a sliding bearing. This ensures that the driving member is always correctly positioned coaxially with respect to the driven member and centered in relation to the housing. Instead of the pin, it is also possible to form a cup in non-cutting manner onto the sheet metal part. This reduces the number of components.

The assembly can be simplified by providing a lug upon the claw radially outside the center of the clamping rollers for engagement behind the clamping roller in circumferential direction. This ensures that the clamping rollers are securely retained against loss between the lug and the spring element, thereby effecting a preassembled unit, comprised of driven element, driving element, clamping rollers and spring elements, for installation in the housing. It is certainly possible to provide the claws with further lugs radially inwardly of the clamping roller center for engagement behind the clamping rollers in circumferential direction, thereby effecting a preassembled unit, comprised of driving member, clamping rollers and spring elements, with the clamping rollers being retained in both radial directions between the lugs.

The spring element can be formed by a sheet metal part that is bent in a v-shaped manner and has thinwalled spring legs exhibiting free leg ends which radially engage the clamping rollers within the center of the clamping rollers. The assembly of these spring elements is effected by compressing the spring legs together and inserting them radially between the clamping rollers of the pair of clamping rollers, with the free leg ends radially rebounding within the center of the clamping rollers and engaging behind the clamping rollers. These spring elements are thus secured against loss in radial direction. Such spring elements are particularly advantageous in combination with the afore-mentioned lugs provided on the claws because the clamping rollers can be effectively secured against loss between the lugs and the spring legs.

It is particularly useful to connect a friction element between the housing and the driven element if, for example, the clamp-type locking mechanism of the invention is used for adjusting the seat height in motor vehicles. A spring engages the driven mechanism for seeking to push the seat vertically upwards and thereby exerts a torque upon the driven element. When actuating the clamp-type locking mechanism according to the invention for changing the seat height, a torque is applied to the driving element. The claws force the clamped clamping rollers out of their clamping position. This enables relative motions between the housing and the driven element. Since the torque load acts upon the driven element and is effective in a same direction as the torque load upon the drive, the driven element trails the driving element and clamps the respective clamping rollers once again. In case the driving moment continues to be applied, then the clamping rollers are again released. As a consequence, an undesired stick-slip effect can occur, with the clamping rollers being clamped and released again in rapid succession. The interposed friction disk causes a friction moment that acts between the driving element and the housing and is dimensioned of such magnitude that the driven element does not trail or lags only at great delay after release of the clamping rollers. This ensures that upon released clamping rollers, the claws of the driving element bear upon the stops of the driven element and thereby effect a transmission of the driving torque upon the driven element.

An inexpensive friction disk which is easy to assemble exhibits preferably a central opening with a surface area that circumscribes a polyhedral profile which protrudes in the already existing valleys of the sheet metal part, with the friction disk being provided on its outer surface area with radially projecting friction lugs which are in frictional contact with a cylindrical inside wall surface of the housing. The cylindrical inside wall surface can, for example, be formed by the inner cylindrical clamping surface, with the surface area of the central opening matching ideally the outer contour of the sheet metal jacket. It is evident that the described friction disk can be integrated without significant modifications of the remaining components so that this modified clamp-type locking mechanism according to the invention can also be made in a very cost-efficient manner.

BRIEF DESCRIPTION OF THE DRAWING

The invention will now be described in more detail with reference to two exemplified embodiments shown in a total of six Figures, wherein.

DETAILED DESCRIPTION OF THE INVENTION

Figure 1:
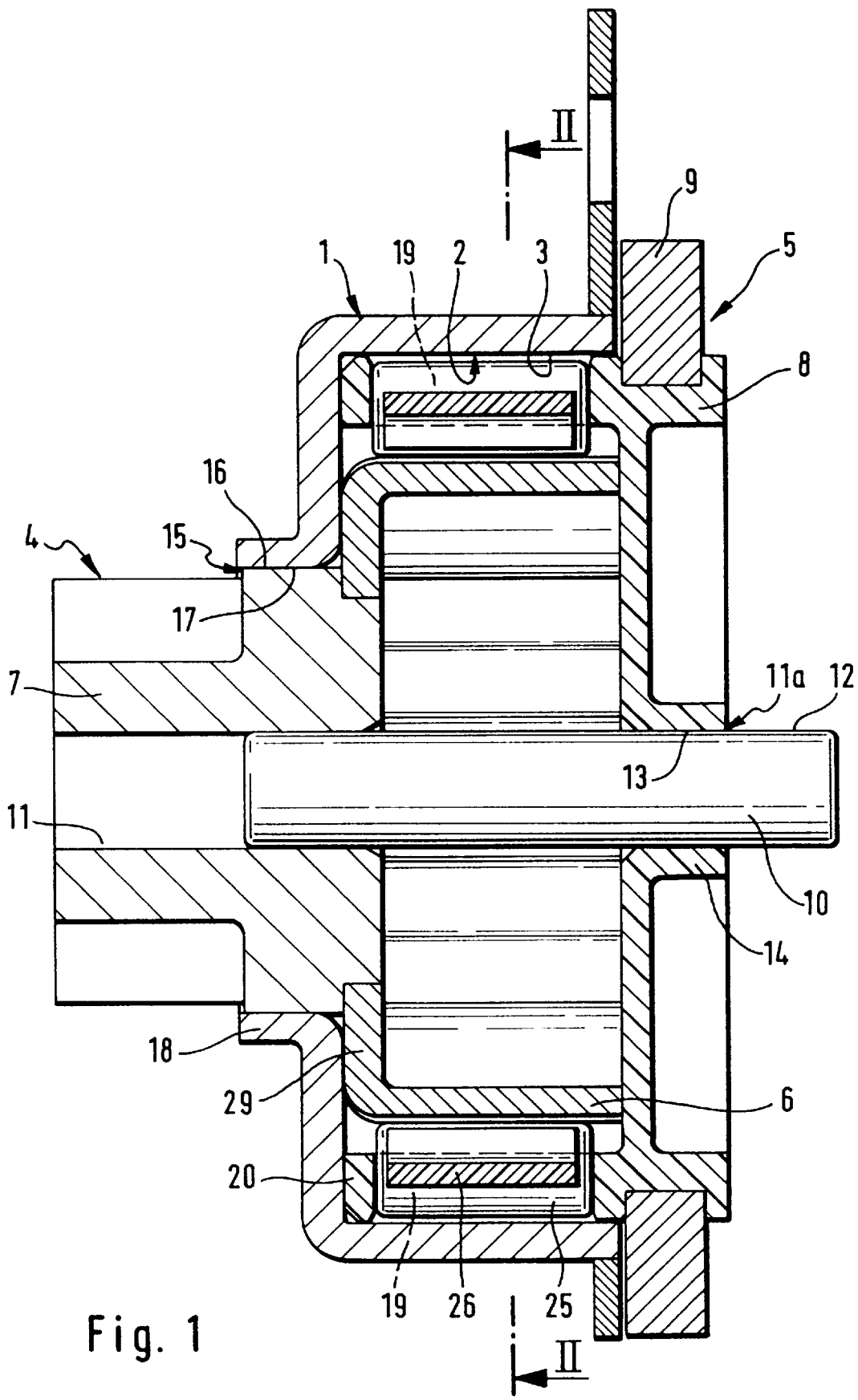
FIG. 1 shows a longitudinal section through a clamp-type locking mechanism according to the invention.

The clamp-type locking mechanism according to the invention and shown in FIG. 1 includes a housing 1 with a bore 2 which has a bore wall forming an inner cylindrical clamping surface 3. Arranged coaxially to the bore 2 are a driven element 4 and a driving element 5. The driven element 4 includes an annular closed sheet metal jacket 6 and a driven member 7 which is connected thereto without relative rotation therebetween. The driving element 5 includes a plastic disk 8 which is connected to a driving member 9 without relative rotation therebetween. A pin 10 is arranged coaxially to the bore 2 and press-fitted in a pin bore 11 of the driven member 7. The plastic disk 8 is rotatably supported by a sliding bearing 11a upon the pin 10, with the sliding bearing 11a being formed by the outer surface area 12 of the pin 10 and the inner surface area 13 of an axial collar 14 of the plastic disk 8. Provided between the driven member 7 and the housing 1 is a further sliding bearing 15 which is formed by a cylindrical surface area 16 of the driven member 7 and the inner surface area 17 of an axial collar 18 of the housing 1. The plastic disk 8 is provided with claws 19 that jut axially into the bore 2, with the ends of the claws 19 that are distant to the plastic disk 8 being connected together in one piece by means of a ring 20. The remaining structure of the clamp-type locking mechanism according to the invention is described in a better way with reference to FIG. 2.

The sheet metal jacket 6 is formed over its circumference with plateaus 21 and valleys 22 in alternating relationship. Each plateau 21 is provided with two circumferential neighboring clamping ramps 23, 24 that extend at an obtuse angle at increasing distance from the inner cylindrical clamping surface 3. Two clamping rollers 25 are arranged upon each plateau 22 and respectively associated to the clamping ramps 23, 24. Provided between both clamping rollers 25 is a spring element 26 which tends to push apart the clamping rollers 25 to thereby keep them in a preparatory clamping stage with the inner cylindrical clamping surface 3 and the clamping ramps 23, 24. The claws 19 engage in the valleys 22 at clearance in the circumferential directions. Furthermore, each claw 19 exhibits contact surfaces 27 for the neighboring clamping rollers 25. Furthermore, lugs 27a are formed in one piece with the claws 19 radially outside the clamping roller centers and facing the neighboring clamping rollers 25 for engaging behind the clamping rollers 25 in circumferential direction. As shown in the drawing, the clearance in circumferential direction between the claws 19 and their neighboring clamping rollers 25 is smaller than the clearance between the claws 19 and the peripheral walls 28 of the valleys 22. A polyhedral profile can be seen inside the sheet metal jacket 6 for formation of a radial collar 29 of the sheet metal jacket 6 at the inner circumference.

The operation of the clamp-type locking mechanism will now be described in more detail with reference to both Figures. Upon rotation of the driving element 5 relative to the stationary housing 1, the contact surfaces 27 of the claws 19 are shifted to bear upon the clamping rollers 25 to force them out of their clamping zone. Only one clamping roller 25 of each pair of clamping rollers associated to a plateau 21 is pushed away from the clamping surface 3 and the clamping ramps 23, 24, i.e. depending on the direction of rotation of the driving member 5 the one or the other clamping roller 25. The other clamping roller 25 which continues to remain in its position ready to clamp is thus prevented from executing a clamping action because this clamping roller 25 rolls in direction towards the other clamping roller 25 as a result of the rotational direction of the driving member 5 relative to the housing 1 and is thus no longer ready to clamp. After release of the clamping rollers 25, the claws 19 impact the walls 28 of the sheet metal jacket 6, whereby a further rotational motion of the driving element 5 is transmitted onto the driven element 4. If, however, a rotational motion is introduced to the driven element 4, the clamping rollers 25 that are already in a preparatory clamping stage are increasingly captivated between the clamping ramps 23, 24 and the inner cylindrical clamping surface 3, thereby preventing a rotational motion of the driven element 4 relative to the housing 1.

Figure 2:
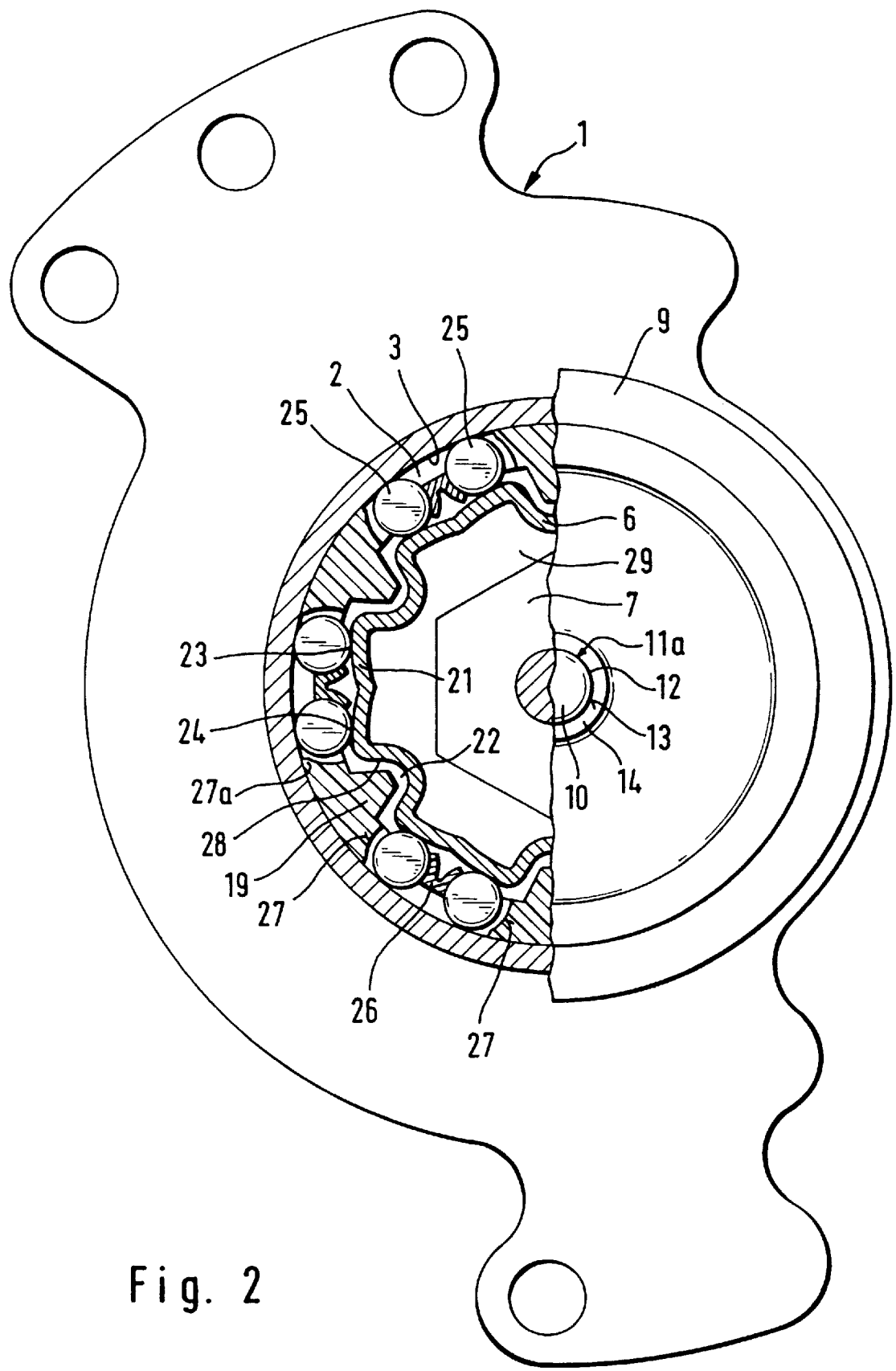
FIG. 2 shows a partial cross section taken along the line II—II through the clamp-type locking mechanism according to the invention, as shown in FIG. 1.
Figure 3:
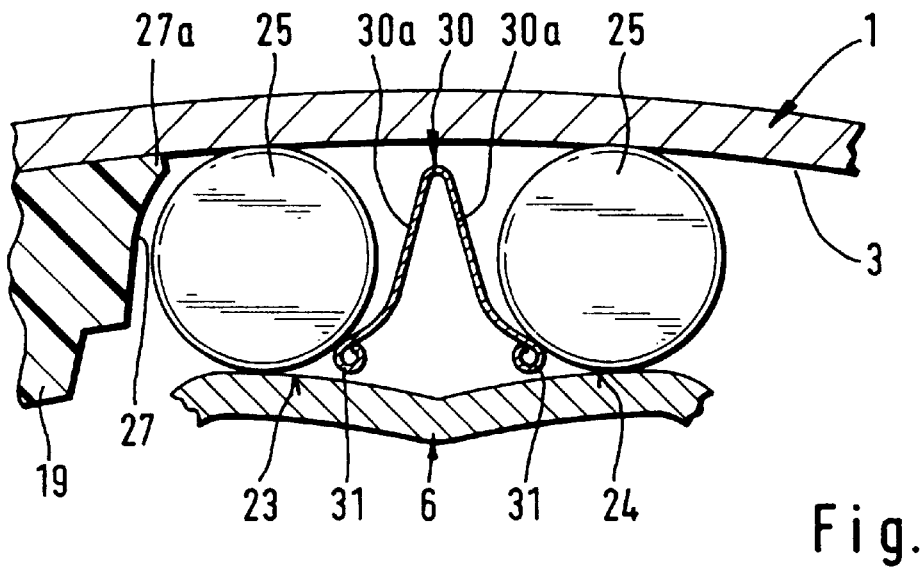
FIG. 3 is a view of an alternative spring element.
Figure 4:
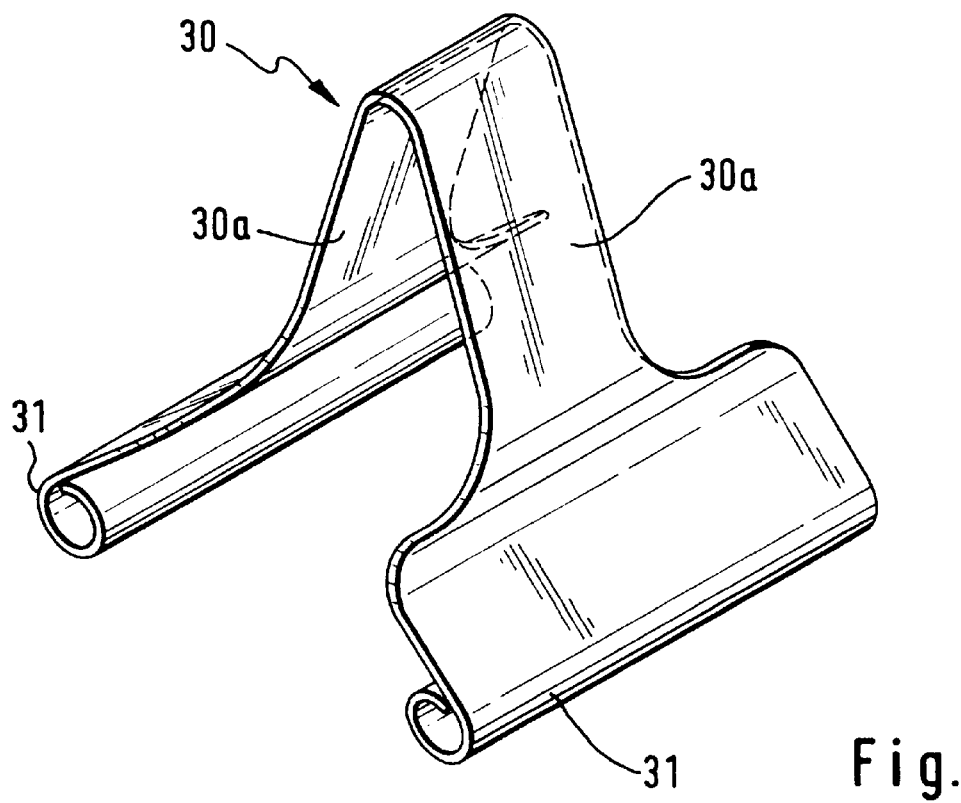
FIG. 4 is a perspective illustration of the spring element of FIG. 3.

FIG. 3 shows an enlarged section of FIG. 2, however with modified spring element 30 made of steel, as opposed to the spring element 26 made of plastic material. The perspective illustration according to FIG. 4 shows two spring legs 30a having free leg ends 31 that are curled in the direction of the respectively other spring leg 30a. This ensures that the free leg ends are prevented from interlocking on the clamping ramps 23, 24. Moreover, the free leg ends 31 expand axially on both sides in relation to the spring legs 30a in such a manner that the clamping rollers 25 are spring-biased over a major part of their axial extension. The spring element 30 can be inserted radially between two clamping rollers 25 in a same manner as the spring element 26, with the free leg ends 31 being resiliently pushed apart after passing the clamping roller centers for engaging behind the clamping rollers 25. This ensures that the clamping rollers 25 are securely held against loss between the lugs 28 and the free spring legs 31.

Figure 5:
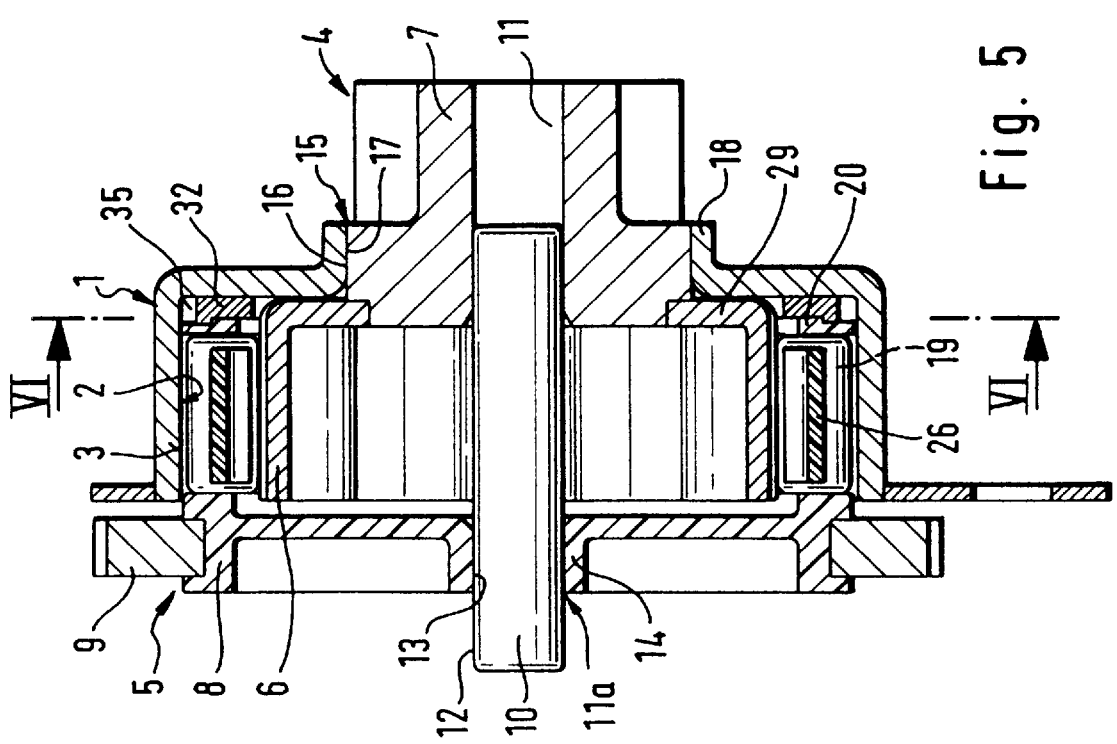
FIG. 5 is a longitudinal section through a further clamp-type locking mechanism according to the invention.

The clamp-type locking mechanism according to the invention shown in FIG. 5 differs from the above-described embodiment essentially by the arrangement of a friction disk 32 in form-fitting manner upon the sheet metal jacket 6 and its friction contact with the housing 1.

Figure 6:
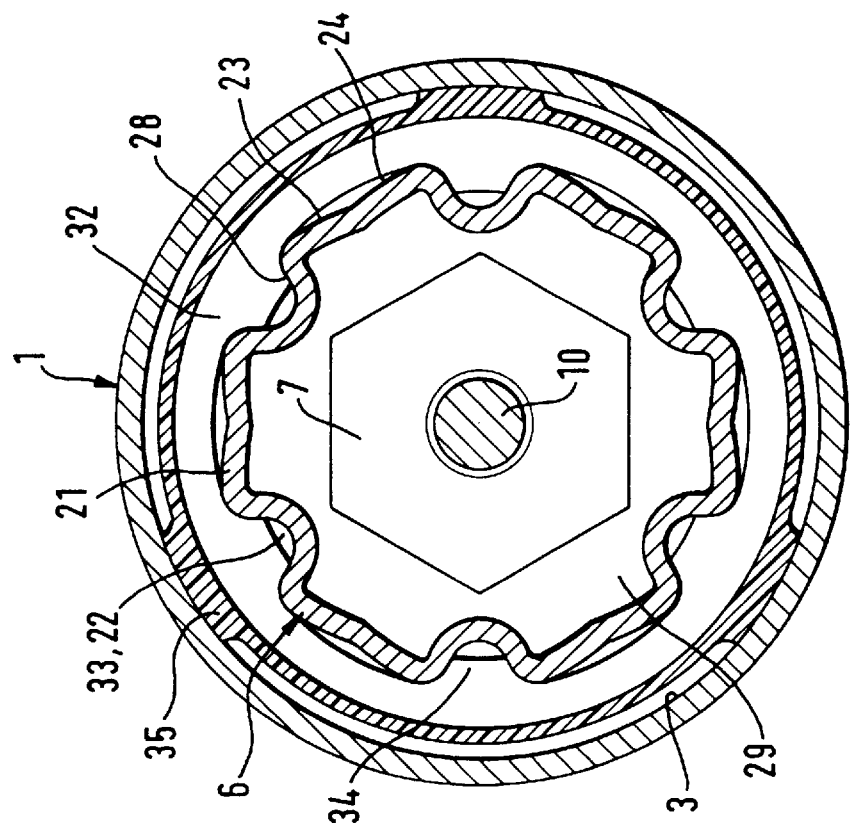
FIG. 6 is a cross section through the clamp-type locking mechanism according to the invention, taken along the line VI—VI in FIG. 5.

FIG. 6 shows a cross section of the clamp-type locking mechanism, with the friction disk 32 in axial plan view. The friction disk 32 is formed with a central opening 33 that circumscribes the perimeter of the sheet metal jacket 6 and has a surface area in form of a polyhedral profile 34 which dips into the valleys 22 of the sheet metal part 6. The friction disk 32 is arranged in the circumferential directions upon the sheet metal jacket 6 and secured against relative rotation therebetween. Frictional lugs 35 project radially from the outer surface area of the friction disk 32 and are in frictional contact with the inner cylindrical clamping surface 3 of the housing 1. The operation of the friction disk 32 will now be described:

Clamp-type locking mechanisms according to the invention that are provided with this friction disk 32 are in particular suitable for application in motor vehicles for vertical seat adjustment. In such adjusting mechanisms, frequently a pre-loaded spring engages the driven element 4, with the spring force being transmitted as torque onto the driven element 4. This spring torque aids in moving the seat height upwardly. Consequently, a driving torque applied to the driving element 5 for adjusting the seat height in upward direction acts in a same direction as the afore-mentioned spring torque. Upon actuation of the driving element 5, the clamping rollers 25 are initially released in a manner as described above. After release, a relative rotation of the driven element 4 and the sheet metal jacket 6 relative to the housing 1 is possible. The spring torque seeks to rotate the sheet metal jacket 6 relative to the housing 1. This rotational motion is however prevented or at least greatly delayed by the friction disk 32 so that the claws 19, after release of the clamping rollers 25, catch the sheet metal part 6 and transmit in this manner the driving torque to the driven element 4. In case the friction disk 32 is omitted, the described lagging of the sheet metal jacket 6 results in an undesired stick-slip effect in which the clamping rollers are released and captivated in rapid succession.

What is claimed is:

1. A clamp-type locking mechanism, comprising a housing (1) with an inner cylindrical clamping surface (3), with a driving element (5) rotatable with respect to the housing (1) and with a driven element (4) positioned coaxially with respect to the cylindrical clamping surface (3), with the driven element (4) being provided with clamping ramps (23, 24) facing the clamping surface (3) for arrangement of clamping roller pairs in the form of two clamping rollers (25) arranged successively in circumferential direction, wherein both clamping rollers (25) of the clamping roller pairs are spring-biased by an interposed spring element (26, 30) in direction away from each other towards the clamping surface (3) and the clamping ramp (23, 24), with the driven element (4) being provided with stops (28) for claws (19) of the driving element (5) which engage between two neighboring clamping roller pairs, and with the claws (19) forming contact surfaces (27) for one of each of the clamping rollers (25) of a clamping roller pair at their sides facing the stops (28), wherein a peripheral clearance between the stops (28) and the claws (19) is greater than a peripheral clearance between the contact areas (27) and the clamping rollers (25), said driven element (4) being formed by a first thin-walled sheet metal part (6) which has an annular closed sheet metal jacket drawn radially inwardly at several locations distributed about the circumference at formation of valleys (22), with the stops being formed by circumferential walls (28) of the valleys (22) and circumferentially bounding plateaus (21) provided with the clamping ramps (23, 24).

2. The clamp-type locking mechanism of claim 1 wherein the driving element (5) is formed by a plastic disk (8) with integral plastic claws (19) and by a driving member (9) so secured to the plastic disk (8) as to prevent a rotation therebetween.

3. The clamp-type locking mechanism of claim 1 wherein a driven element (4) is so connected to the sheet metal part (6) as to prevent a rotation therebetween.

4. The clamp-type locking mechanism of claim 1 wherein each of the claws (19) is provided with two contact areas (27) for two clamping rollers (25) of two clamping roller pairs, with the contact areas (27) disposed on both sides of the claw (19).

5. The clamp-type locking mechanism of claim 1 wherein the sheet metal part (6) is provided at one axial end with a radially flanged radial collar (29) with an inner circumference shaped as a polyhedron.

6. The clamp-type locking mechanism of claim 1 wherein a sliding bearing (15) is provided between the driven element (4) and the housing (1).

7. The clamp-type locking mechanism of claim 2 wherein a cylindrical pin (10) is secured in the driven element (4) coaxially with respect to the driving element (5) and the driven element (4), with the plastic disk (8) supported on the pin (10) by way of a sliding bearing (11a).

8. The clamp-type locking mechanism of claim 1 wherein lugs (27a) disposed on the claws (19) radially outside the center of the clamping roller engage behind the clamping rollers (25) in circumferential direction.

9. The clamp-type locking mechanism of claim 1 wherein the spring element is formed by a second sheet metal part (30) bent in the shape of a V, to define thin-walled spring legs (30a) of the second sheet metal part (30) having free leg ends (31) which engage behind the clamping rollers (25) radially inside of the clamping roller center.

10. A clamp-type locking mechanism, comprising a housing (1) with an inner cylindrical clamping surface (3), with a driving element (5) rotatable with respect to the housing (1) and with a driven element (4) positioned coaxially with respect to the cylindrical clamping surface (3), with the driven element (4) being provided with clamping ramps (23, 24) facing the clamping surface (3) for arrangement of clamping roller pairs in the form of two clamping rollers (25) arranged successively in circumferential direction, wherein both clamping rollers (25) of the clamping roller pairs are spring-biased by an interposed spring element (26, 30) in direction away from each other towards the clamping surface (3) and the clamping ramp (23, 24), with the driven element (4) being provided with stops (28) for claws (19) of the driving element (5) which engage between two neighboring clamping roller pairs, and with the claws (19) forming contact surfaces (27) for one of each of the clamping rollers (25) of a clamping roller pair at their sides facing the stops (28), wherein a peripheral clearance between the stops (28) and the claws (19) is greater than a peripheral clearance between the contact surfaces (27) and the clamping rollers (25), and further comprising a friction element (32) connected between the housing (1) and the driven element (4).

11. The clamp-type locking mechanism of claim 10 wherein the friction element is formed by a friction disk (32) which is connected in a form-fitting manner with the driven element (4, 7) and is in frictional contact with a friction surface (3) of the housing (1).

12. The clamp-type locking mechanism of claim 11 wherein the friction disk (32) is provided with a center opening exhibiting a surface area circumscribing a polyhedral profile (34), wherein the polyhedral profile (34) dips in valleys (22) of the driven element (4) and wherein the outer surface area of the friction disk (32) is provided with radially projecting friction lugs (35) which are in frictional contact with a cylindrical inner wall (3) of the housing (1).

* * * * *